United States Patent
Maslehuddin et al.

(10) Patent No.: US 10,457,603 B2
(45) Date of Patent: *Oct. 29, 2019

(54) CASTING METHOD FOR MAKING A LIGHTWEIGHT CONCRETE PRODUCT

(71) Applicant: KING FAHD UNIVERSITY OF PETROLEUM AND MINERALS, Dhahran (SA)

(72) Inventors: Mohammed Maslehuddin, Dhahran (SA); Salah U. Al-Dulaijan, Dhahran (SA); Mohammed Rizwan Ali, Dhahran (SA); Mahmoud Nasr, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,285

(22) Filed: Feb. 14, 2019

(65) Prior Publication Data

US 2019/0177227 A1    Jun. 13, 2019

Related U.S. Application Data

(63) Continuation of application No. 15/084,653, filed on Mar. 30, 2016, now Pat. No. 10,308,553.

(51) Int. Cl.
| | | |
|---|---|---|
| *C04B 28/04* | (2006.01) | |
| *C04B 28/00* | (2006.01) | |
| *C04B 28/06* | (2006.01) | |
| *C04B 28/08* | (2006.01) | |
| *C04B 28/10* | (2006.01) | |
| *C04B 111/28* | (2006.01) | |
| *C04B 111/40* | (2006.01) | |

(52) U.S. Cl.
CPC ............ *C04B 28/04* (2013.01); *C04B 28/006* (2013.01); *C04B 28/065* (2013.01); *C04B 28/08* (2013.01); *C04B 28/10* (2013.01); *C04B 2111/28* (2013.01); *C04B 2111/40* (2013.01); *C04B 2201/32* (2013.01); *Y02P 40/165* (2015.11); *Y02W 30/91* (2015.05); *Y02W 30/92* (2015.05); *Y02W 30/94* (2015.05)

(58) Field of Classification Search
CPC ....... C04B 28/04; C04B 28/08; C04B 28/006; C04B 28/10; C04B 28/065; C04B 2201/32; C04B 2111/40; C04B 2111/28; Y02W 30/94; Y02W 30/92; Y02W 30/91; Y02P 40/165

See application file for complete search history.

(56) References Cited

U.S. PATENT DOCUMENTS

| | | | |
|---|---|---|---|
| 5,395,442 A | 3/1995 | Dunton et al. | |
| 6,800,129 B2 | 10/2004 | Jardine | |
| 8,293,006 B2 | 10/2012 | Alhozaimy et al. | |
| 9,039,830 B2 | 5/2015 | Alhozaimy et al. | |
| 2009/0078161 A1 | 3/2009 | Woolfsmith | |
| 2014/0336305 A1 | 11/2014 | Shink et al. | |

OTHER PUBLICATIONS

V. Khonsari et al., "Effects of expanded perlite aggregate (EPA) on the mechanical behavior of lightweight concrete" Proceedings of FraMCOS-7, 2010, pp. 1354-1361.
A. Yeginobali et al., "High strength natural lightweight aggregate concrete with silica fume" https://pantherfile.uwm.edu/sobolev/www/CANMET-ACI-SP178-38.pdf, pp. 739-758.
K. Aziz, "Mechanical Properties of High Strength Light Weight Aggregate Concrete" Http://www.researchgate.net/publication/277890546_mechanical_properties_of_high_strength_light_weight_aggregate_concrete, 2015, pp. 1.
Silica Fume User's Manual, Silica Fume Association, Apr. 2005, p. 1-14.

*Primary Examiner* — Robert S Jones
(74) *Attorney, Agent, or Firm* — Oblon, McClelland, Maier & Neustadt, L.L.P.

(57) ABSTRACT

A structural lightweight concrete composition comprising cement, a fine aggregate such as sand, a natural coarse aggregates, such as limestone, scoria or perlite or mixtures thereof, a synthetic coarse aggregate comprising a polymeric material, such as polypropylene beads, an industrial waste byproduct in the form of fine particles, such as silica fume or heavy oil ash, a superplasticizer, such as a polycarboxylate ether and water demonstrating lower thermal conductivity and sufficient compressive strength. Concrete products made therefrom and methods for producing such products are also provided.

6 Claims, No Drawings

CASTING METHOD FOR MAKING A LIGHTWEIGHT CONCRETE PRODUCT

CROSS-REFERENCE TO RELATED APPLICATIONS

The present application is a Continuation of Ser. No. 15/084,653, now allowed, having a filing date of Mar. 30, 2016.

BACKGROUND OF THE INVENTION

Technical Field

The present disclosure relates to structural lightweight concrete compositions that offer low thermal conductivity, more particularly cement/aggregate compositions comprising a natural coarse aggregate, a polymeric synthetic coarse aggregate and industrial waste byproduct fine particles, concrete products made therefrom and methods for producing such products.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Lightweight concrete (LWC) is a conglomerate of cement and lightweight aggregates. It has a bulk density ranging between 300 and 2000 kg/m$^3$ compared to a value of 2200 to 2600 kg/m$^3$ for normal weight concrete (NWC). Some of the advantages of using lightweight concrete include, i) reduction in the dead load, ii) lighter and smaller elements, iii) high thermal insulation, and iv) enhancement in fire resistance. According to the American Concrete Institute (ACI) standards [ACI 213—incorporated herein by reference in its entirety], structural lightweight concrete (SLWC) is a concrete that is prepared with lightweight aggregates and whose average unit weight ranges from 1400 to 1900 kg/m$^3$ and demonstrates a compressive strength greater than 17.0 MPa. Structural lightweight concrete provides technical, environmental, and economical advantages and has quickly become a material of the future as the world grows more conscious of energy conservation.

There are clear advantages of structural lightweight concrete over normal weight concrete. For example, structural lightweight concrete has a greater strength/weight ratio, lower thermal conductivity, superior fire resistance, and enhanced durability properties. In addition, the use of structural lightweight concrete decreases the dead load, which leads to a reduction in the size of columns, beams, walls and foundations that reduces resulting seismic loads and earthquake damage, which are proportional to the weight of the structure. However, the most significant potential advantage to the use of structural lightweight concrete is environmental protection. If the raw materials needed for the production of structural lightweight concrete can be derived from natural sources and industrial waste products, the environment and economy stands to benefit. In addition, the use of structural lightweight concrete can result in a significant reduction in greenhouse gas emissions by reducing the need for larger quantities of cement whose production is a major contributor to $CO_2$ emissions.

In view of the forgoing, one object of the present disclosure is to provide structural lightweight concrete compositions with high thermal insulation that utilize natural aggregates, polymeric synthetic aggregates and industrial waste byproducts in the disclosed materials. A further aim of the present disclosure is to provide structural lightweight concrete products comprising said compositions and to provide methods for producing said structural lightweight concrete products.

BRIEF SUMMARY OF THE INVENTION

According to a first aspect, the present disclosure relates to a structural lightweight concrete composition comprising i) cement, ii) a fine aggregate, iii) a natural coarse aggregate, iv) a synthetic coarse aggregate comprising a polymeric material, v) an industrial waste byproduct in the form of fine particles, vi) a superplasticizer, and vii) water, wherein the average particle size of the fine aggregate and the industrial waste byproduct is less than or equal to 1 mm and the average particle size of the synthetic coarse aggregate and the natural coarse aggregate is greater than 1 mm, and wherein the weight ratio of water to cement is in the range of 0.33 to 0.8 and is sufficient to affect hydraulic setting of the cement.

In one embodiment, the synthetic coarse aggregate comprising a polymeric material is spherical polypropylene beads with an average particle size of 2-15 mm.

In one embodiment, the structural lightweight concrete composition has a weight percentage of the synthetic coarse aggregate comprising a polymeric material ranging from 2-15% relative to the total weight of the composition.

In one embodiment, the cement is present in the structural lightweight concrete composition at 300-500 kg/m$^3$.

In one embodiment, the structural lightweight concrete composition has a weight percentage of cement ranging from 20-30% relative to the total weight of the composition.

In one embodiment, the fine aggregate is sand with an average particle size of less than 700 μm.

In one embodiment, the structural lightweight concrete composition has a weight percentage of the fine aggregate ranging from 15-30% relative to the total weight of the composition.

In one embodiment, the natural coarse aggregate is at least one selected from the group consisting of limestone, perlite, and scoria.

In one embodiment, the structural lightweight concrete composition has a weight percentage of the natural coarse aggregate ranging from 20-45% relative to the total weight of the composition.

In one embodiment, the natural coarse aggregate comprises crushed limestone having an average particle size in the range of 1-20 mm.

In one embodiment, the industrial waste byproduct is at least one selected from the group consisting of silica fume and heavy oil ash.

In one embodiment, the structural lightweight concrete composition has a weight percentage of the industrial waste byproduct in the form of fine particles ranging from 0.5-10%/relative to the total weight of the composition.

In one embodiment, the superplasticizer is a polycarboxylate ether.

In one embodiment, the structural lightweight concrete composition has a weight percentage of the superplasticizer ranging from 0.1-2.0% relative to the total weight of the composition.

In one embodiment, the structural lightweight concrete composition has a weight percentage of water ranging from 10-20% relative to the total weight of the composition.

In one embodiment, the structural lightweight concrete composition has a 28-day unit weight in the range of 1600-1900 kg/m³ after setting.

In one embodiment, the structural lightweight concrete composition has a compressive strength in the range of 20-40 MPa after setting.

In one embodiment, the structural lightweight concrete composition has a thermal conductivity in the range of 0.3-0.7 W/(m·K) after setting.

According to a second aspect, the present disclosure relates to a method for producing a cast concrete product comprising the structural lightweight concrete composition in any of its embodiments, the method comprising i) mixing the cement, the fine aggregate, the natural coarse aggregate, the synthetic coarse aggregate and the industrial waste byproduct in the form of fine particles to form a solid cement mixture, ii) adding water and a superplasticizer to the cement mixture to affect hydraulic setting while maintaining a slump in the range of 50-100 mm to form a fluid concrete mixture and iii) casting the concrete mixture in a predetermined shape by placing the fluid concrete mixture in a mold to produce a cast concrete product after setting.

According to a third aspect, the present disclosure relates to a cast concrete product comprising the structural lightweight concrete composition in any of its embodiments.

The foregoing paragraphs have been provided by way of general introduction, and are not intended to limit the scope of the following claims. The described embodiments, together with further advantages, will be best understood by reference to the following detailed description.

DETAILED DESCRIPTION OF THE EMBODIMENTS

According to a first aspect, the present disclosure relates to a structural lightweight concrete composition comprising i) cement, ii) a fine aggregate, iii) a natural coarse aggregate, iv) a synthetic coarse aggregate comprising a polymeric material, v) an industrial waste byproduct in the form of fine particles, vi) a superplasticizer, and vii) water.

The main ingredients of concrete include, but are not limited to, cement, water, aggregates, chemical admixtures and mineral admixtures. There are many types of concretes created by varying the proportions of the main ingredients. In this manner or by substitution of the cementitious and aggregate phases, the finished product can be tailored to its application with varying strength, density, or chemical and thermal resistance properties. As used herein "concrete" refers to a composite material composed of aggregate bonded together with a fluid cement which hardens over time. In hydraulic cement concretes, when the aggregate is mixed together with the dry cement and water, they form a fluid mass that is easily molded into shape. The cement reacts chemically with the water and other ingredients to form a hard matrix which binds all of the materials together into a durable stone-like material that has many uses. Often, additives are included in the mixture to improve the physical properties of the wet mix or the finished material. In terms of the present disclosure, the composition may refer to the fresh state solid cement or concrete mixture comprising the cement, the fine aggregate, the natural coarse aggregate, the synthetic coarse aggregate and the industrial waste byproduct in the form of fine particles before the addition of the water and/or superplasticizer, the composition may refer to a formable or self-placing fluid concrete mixture after the addition of all or a portion of the water and/or superplasticizer, and the composition may refer to the hardened matrix concrete after any period of setting once the hydration process has started. In a preferred embodiment, all components of the structural lightweight concrete composition of the present disclosure are homogeneously dispersed in the composition.

As used herein, "structural lightweight concrete" as defined in ASTM C 330 is concrete having a minimum 28-day compressive strength of 17 MPa (2500 psi) and an equilibrium density in the range of 1120-1920 kg/m³ (70-120 lb/ft³). This stands in contrast to normal weight concrete. As used herein, "normal weight concrete" refers to concrete having an equilibrium density of 2240-2480 kg/m³ (140-155 lb/ft³). This definition is not a specification, project specifications vary by necessity. While structural lightweight concrete with an equilibrium density of 1120-1680 kg/m³ (70-105 lb/ft³) is infrequently used, most structural lightweight concrete has an equilibrium density of 1680-1920 kg/m³ (105-120 lb/ft³). As used herein, "equilibrium density" as defined in ASTM 567 is the density reached by structural lightweight concrete after exposure to relative humidity of 50±5% and a temperature of 23±2° C. for a period of time sufficient to reach a density that changes less than 0.5% in a period of 28 days.

As used herein, "structural lightweight concrete" also includes aggregate that is either entirely lightweight aggregate or a combination of lightweight and normal density aggregate. As used herein, "lightweight aggregate" as defined in ASTM C 330 has a bulk density of less than 1120 kg/m³ (70 lb/ft³) for fine aggregate and less than 880 kg/m³ (55 lb/ft³) for coarse aggregate. As used herein, the terms "fine" and "coarse" refer to the average particle size, here the average particle size of the aggregate and additives of the structural lightweight concrete composition. As used herein, average particle size refers to the longest linear dimension of the particle. In terms of the present disclosure, "fine" refers to having an average particle size of less than or equal to 1 mm, preferably less than 900 μm, preferably less than 800 μm, preferably less than 750 μm, preferably less than 700 μm, preferably less than 650 μm, preferably less than 600 μm, preferably less than 550 μm, preferably less than 500 μm, preferably less than 400 μm, preferably less than 300 μm, preferably less than 200 μm, preferably less than 150 μm, preferably less than 100 μm. In terms of the present disclosure, "coarse" refers to having an average particle size of greater than 1 mm, preferably greater than 5 mm, preferably greater than 10 mm, preferably greater than 15 mm, preferably greater than 20 mm, preferably greater than 25 mm, preferably greater than 30 mm, preferably greater than 40 mm, preferably greater than 50 mm, such as for example 1-20 mm, preferably 2-18 mm, preferably 3-15 mm, preferably 4-12 mm, preferably 5-10 mm. In a preferred embodiment, the average particle size of the fine aggregate and the industrial waste byproduct is less than or equal to 1 mm and the average particle size of the synthetic coarse aggregate and the natural coarse aggregate is greater than 1 mm. As used herein, a "natural" aggregate refers to a natural substance derived from a mineral source. As used herein, a "synthetic" aggregate refers to substance or compound that is made artificially through chemical reactions.

The structural lightweight concrete composition of the present disclosure comprises cement. As used herein, "cement" is a binder, a substance that sets and hardens and can bind other materials together. Cements used in construction can be characterized as being either hydraulic or non-hydraulic, depending upon the ability of the cement to set in the presence of water. Non-hydraulic cement will not set in wet conditions or underwater; rather, it sets as it dries and reacts with carbon dioxide in the air and can be attacked by some aggressive chemicals after setting. In terms of the present disclosure, the cement of the structural lightweight concrete composition may be a non-hydraulic cement, a hydraulic cement, or mixtures thereof, preferably a hydraulic cement.

Non-hydraulic cement, such as slaked lime (calcium hydroxide mixed with water), hardens by carbonation in the presence of carbon dioxide which is naturally present in the air. First calcium oxide is produced from calcium carbonate by lime calcination at temperatures above 800° C. for a period of time greater than 8 hours at atmospheric pressure. The calcium oxide is then slaked by mixing it with water to make slaked lime (calcium hydroxide). Once the excess water is completely evaporated (process technically called setting), the carbonation starts. This reaction may take a significant amount of time due to the partial pressure of carbon dioxide in the air being low. The carbonation reaction requires that the dry cement be exposed to air, for this reason the slaked lime is a non-hydraulic cement that cannot be used under water. This whole process can optionally be referred to as the lime cycle.

Conversely, hydraulic cement hardens by hydration when water is added. Hydraulic cements set and become adhesive due to a chemical reaction between the dry ingredients and water. The chemical reaction results in mineral hydrates that are not very water soluble and thus are quite durable in water and safe from chemical attack. This allows setting in wet conditions or underwater and further protects the hardened material from chemical attack. Hydraulic cements are made of a mixture of silicates and oxides, the four main components being: i) belite ($2CaO.SiO_2$), ii) alite ($3CaO.SiO_2$), iii) tricalcium aluminate ($3CaO.Al_2O_3$, also referred to as celite), and iv) tetracalcium alumino ferrite ($4CaO.Al_2O_3.Fe_2O_3$ or brownmillerite). In general, the silicates are responsible for the mechanical properties of the cement, while the tricalcium aluminate and tetracalcium alumino ferrite allow the formation of the liquid phase during any sintering or firing and they control the durability and performance of the cement. Combining water with a hydraulic cementitious material forms a cement paste by the process of hydration. The cement paste glues the aggregate together, fills voids within it, and makes it flow more freely. Hydration involves many different reactions, often occurring at the same time. As the reactions proceed, the products of the cement hydration process gradually bond together the individual aggregate particles and other components of the concrete to form a solid mass. A cement notation for a general hydration reaction is represented by formula (I), the standard notation for a general hydration reaction is represented by formula (II), and a balanced general hydration reaction is represented by formula (III).

$$C_3S + H \rightarrow C.S.H + CH \quad (I):$$

$$Ca_3SiO_5 + H_2O \rightarrow (CaO).(SiO_2).(H_2O)(gel) + Ca(OH)_2 \quad (II):$$

$$2Ca_3SiO_5 + 7H_2O \rightarrow 3(CaO).2(SiO_2).4(H_2O)(gel) + 3Ca(OH)_2 \quad (III):$$

In a preferred embodiment, the structural lightweight concrete composition of the present disclosure comprises cement and the cement comprises 40-80 wt % of tricalcium silicate (($CaO)_3.SiO_2$, $C_3S$ in cement notation) relative to the total weight of the cement, preferably 45-75 wt %, preferably 50-70 wt %, preferably 52-65 wt %, preferably 54-60 wt %, preferably 56-58 wt % ($CaO)_3.SiO_2$ relative to the total weight of the cement. In a preferred embodiment, the structural lightweight concrete composition of the present disclosure comprises cement and the cement comprises 5-40 wt % of dicalcium silicate (($CaO)_2.SiO_2$, $C_2S$ in cement notation) relative to the total weight of the cement, preferably 6-35 wt %, preferably 7-32 wt %, preferably 10-30 wt %, preferably 12-25 wt %, preferably 14-20 wt %, preferably 15-18 wt % ($CaO)_2.SiO_2$ relative to the total weight of the cement. In a preferred embodiment, the structural lightweight concrete composition of the present disclosure comprises cement and the cement comprises 0.1-20 wt % of tricalcium aluminate (($CaO)_3.Al_2O_3$, $C_3A$ in cement notation) relative to the total weight of the cement, preferably 1-15 wt %, preferably 2-13 wt %, preferably 4-12 wt %, preferably 6-10 wt %, preferably 7-9 wt % ($CaO)_3.Al_2O_3$ relative to the total weight of the cement. In a preferred embodiment, the structural lightweight concrete composition of the present disclosure comprises cement and the cement comprises 0.1-22 wt % of tetracalcium aluminoferrite (($CaO)_4.Al_2O_3.Fe_2O_3$, $C_4AF$ in cement notation) relative to the total weight of the cement, preferably 1-20 wt %, preferably 5-18 wt %, preferably 6-16 wt %, preferably 8-14 wt %, preferably 10-12 wt %, preferably 11.25-11.75 wt % ($CaO)_4.Al_2O_3.Fe_2O_3$ relative to the total weight of the cement.

In a preferred embodiment, the structural lightweight concrete composition of the present disclosure comprises cement and the cement comprises 15-25 wt % of silicon dioxide ($SiO_2$ or S in cement notation) relative to the total weight of the cement, preferably 19-23 wt %, preferably 20-22 wt %, or about 20.5 wt % of $SiO_2$ relative to the total weight of the cement. In a preferred embodiment, the structural lightweight concrete composition of the present disclosure comprises cement and the cement comprises 55-70 wt % of calcium oxide (CaO or C in cement notation) relative to the total weight of the cement, preferably 60-70 wt %, preferably 61-67 wt %, preferably 62-66 wt %, preferably 63-65 wt %, preferably 64.25-64.75 wt % of CaO relative to the total weight of the cement. In a preferred embodiment, the structural lightweight concrete composition of the present disclosure comprises cement and the cement further comprises ferric oxide ($Fe_2O_3$ or F in cement notation), aluminum oxide ($Al_2O_3$, A in cement notation), gypsum ($CaSO_4.2H_2O$), and anhydrite ($CaSO_4$). These compounds are generally present in less than 10 wt % relative to the total weight of the cement, preferably less than 8 wt %, preferably less than 6 wt %, such as for example 0.1-6 wt %, preferably 2.5-6.0 wt %, preferably 3.5-5.75 wt % relative to the total weight of the cement. Other inorganic compounds may be present in the cement including, but not limited to, magnesium, sodium, potassium and oxides or mixtures thereof. These compounds are generally present in less than 2 wt % relative to the total weight of the cement, preferably less than 1 wt %, preferably less than 0.5 wt %, preferably less than 0.4 wt %, preferably less than 0.2 wt % relative to the total weight of the cement.

In a preferred embodiment, the cement of the lightweight concrete composition of the present disclosure is a hydraulic cement, preferably a sulfoaluminous clinker, preferably Portland cement. As used herein, "Portland cement" refers to the most common type of cement in general use around the world developed from types of hydraulic lime and usually originating from limestone. It is a fine powder produced by heating materials in a kiln to form what is called clinker, grinding the clinker, and adding small amounts of other materials. The Portland cement is made by heating limestone (calcium carbonate) with other materials (such as clay) to >1400° C. in a kiln, in a process known as calcination, whereby a molecule of carbon dioxide is liberated from the calcium carbonate to form calcium oxide, or quicklime, which is then blended with the other materials that have been included in the mix to from calcium silicates and other cementitious compounds. The resulting hard substance, called "clinker" is then ground with a small amount of gypsum into a powder to make ordinary Portland cement (OPC). Several types of Portland cement are available with the most common being called ordinary Portland cement (OPC) which is grey in color. The low cost and widespread availability of the limestone, shales, and other naturally occurring materials used in Portland cement make it one of the low cost materials widely used throughout the world. However, Portland cement is caustic, can contain some hazardous components and carries environmental concerns such as the high energy consumption required to mine, manufacture, and transport the cement and the related air pollution including the release of greenhouse gases, dioxins, $NO_X$, $SO_2$, and particulates.

Clinkers make up approximately 90% of Portland cement along with a limited amount of calcium sulfate (which controls the set time) and up to approximately 5% minor constituents (i.e. filler) as allowed by various standards. In a preferred embodiment, clinkers are nodules with an average particle diameter of approximately 2-30 mm, preferably 5-25 mm, preferably 8-20 mm of a sintered material that is produced when a raw mixture of predetermined composition is heated to high temperature. The key chemical reaction which defines Portland cement from other hydraulic limes occurs at these temperatures (>1200° C.) and is when belite ($Ca_2SiO_4$) combines with calcium oxide (CaO) to form alite ($Ca_3SiO_5$).

Portland cement clinkers are generally made by heating (i.e. in a cement kiln) a mixture of raw materials to a calcining temperature of above 500° C. and then a fusion temperature, which is approximately 1400° C. for modern Portland cements to sinter the materials into clinker. The materials in Portland cement clinker are alite, belite, tricalcium aluminate, and tetracalcium alumino ferrite. The aluminum, iron, and magnesium oxides are present as a flux allowing the calcium silicates to form at a lower temperature and do not generally contribute to strength. For specific Portland cements (i.e. low heat or sulfate resistant types) it may be necessary to limit the amount of tircalcium aluminate (3 $CaO.Al_2O_3$) that is formed. The major raw material for the clinker making process is usually limestone ($CaCO_3$) mixed with a second material containing clay as source of alumino silicate. Often, an impure limestone which contains clay or $SiO_2$ is used. The $CaCO_3$ content of these limestones can be as low as 80%. Secondary raw materials (materials in the raw mix other than limestone) depend on the purity of the limestone. Secondary raw materials may include, but are not limited to, clay, shale, sand, iron ore, bauxite, fly ash, slag and the like, when a cement kiln is fired by coal, the ash of the coal may act as a secondary raw material.

Often to achieve the desired setting qualities in the finished Portland cement product, a quantity (~1-10 wt %, preferably 2-8 wt %, or about 5 wt %) of calcium sulfate (often in the form of gypsum or anhydrite) is added to the clinker and the mixture is finely ground to form the finished cement powder, such as for example in a cement mill. The grinding process may be controlled to obtain a powder having a broad particle size range, in which typically 15% by mass consists of particles below 5 μm in diameter, and 5% by mass consists of particles above 45 μm in diameter. The measure of fineness most closely associated with cement is the specific surface area, which refers to the total particle surface area of a unit mass of the cement. The rate of initial reaction (~up to 24 hours) of the cement on addition of water is directly proportional to the specific surface area. In a preferred embodiment, the structural lightweight concrete composition of the present disclosure comprises cement having a specific surface area values in the range of 250-450 $m^2·kg^{-1}$, preferably 275-425 $m^2·kg^{-1}$, preferably 300-400 $m^2·kg^{-1}$, preferably 320-380 $m^2·kg^{-1}$. Typically, general purpose Portland cement falls within these ranges, although it may be as high as 450-700 $m^2·kg^{-1}$ for "rapid hardening" cements.

As used herein, "Portland cement" or "Portland cement clinker" has a tricalcium silicate (($CaO)_3.SiO_2$, $C_3S$) content of 45-75 wt % relative to the total weight of the cement, a dicalcium silicate (($CaO)_3.SiO_2$, $C_2S$) content of 7-32 wt % relative to the total weight of the cement, a tricalcium aluminate (($CaO)_3.Al_2O_3$, $C_3A$) content of 0-13 wt % relative to the total weight of the cement, a tetracalcium aluminoferrite (($CaO)_4.A_2O_3.Fe_2O_3$, $C_4AF$) content of 0-18 wt % relative to the total weight of the cement, and a gypsum ($CaSO_4.2H_2O$) content of 0-10 wt % relative to the total weight of the cement. Furthermore, as used herein "Portland cement or "Portland cement clinker" has a calcium oxide (CaO, C) content of 61-67 wt % relative to the total weight of the cement, a silicon dioxide ($SiO_2$, S) content of 19-23 wt % relative to the total weight of the cement, an aluminum oxide ($Al_2O_3$, A) content of 2.5-6 wt % relative to the total weight of the cement, a ferric oxide ($Fe_2O_3$, F) content of 0-6 wt % relative to the total weight of the cement, and a sulfate ($\bar{S}$) content of 1.5-4.5 wt % relative to the total weight of the cement.

In general, different standards are used for classification of Portland cement. The two major standards are the ASTM C150 used primarily in the USA and the European EN 197. ASTM C150 defines Portland cement as hydraulic cement (cement that not only hardens by reacting with water but also forms a water resistant product) produced by pulverizing clinkers which consist essentially of hydraulic calcium silicates, usually containing one or more of the forms of calcium sulphate as an inter ground addition. The European standard EN 197-1 defines Portland cement as ground Portland cement clinker that is a hydraulic material consisting of at least two thirds by mass of calcium silicates ($3CaO.SiO_2$ and $2CaO.SiO_2$), the remainder consisting of aluminum and iron containing clinker phases and other compounds. The ratio of CaO to $SiO_2$ shall not be less than 2.0 and the magnesium oxide (MgO) content shall not exceed 5.0% by mass. The EN 197 cement types CEM I, II, III, IV and V do not correspond to the similarly named cement types in ASTM C150.

Five types of Portland cements exist, with variations in the first three according to ASTM C150. Type I Portland cement is known as common or general purpose cement and it is generally assumed unless another type is specified. It is commonly used for general construction especially when making precast and precast-prestressed concrete that is not intended to be in contact with soils or ground water. The typical compound compositions of this Type I by weight relative to the total weight of the cement are: 55% ($C_3S$), 19% ($C_2S$), 10% ($C_3A$), 7% ($C_4AF$), 2.8% (MgO), 2.9% ($SO_3$), 1.0% ignition loss, and 1.0% free CaO. A limitation on the composition is that the ($C_3A$) shall not exceed 15%. Type II Portland cement gives off less heat during hydration. This type of cement costs about the same as Type I. This type is for general construction exposed to moderate sulfate attack and is intended for use when concrete is in contact with soils and ground water. The typical compound compositions of this Type II by weight relative to the total weight of the cement are: 51% ($C_3S$), 24% ($C_2S$), 6% ($C_3A$), 11% ($C_4AF$), 2.9% (MgO), 2.5% ($SO_3$), 0.8% ignition loss, and 1.0% free CaO. A limitation on the composition is that the ($C_3A$) shall not exceed 8%, which reduces its vulnerability to sulfates. Type III Portland cement has a relatively high early strength. The typical compound compositions of this Type III by weight relative to the total weight of the cement are: 57% ($C_3S$), 19% ($C_2S$), 10% ($C_3A$), 7% ($C_4AF$), 3.0% (MgO), 3.1% ($SO_3$), 0.9% ignition loss, and 1.3% free CaO. This cement is similar to Type I but ground finer. In some cases a separate clinker with higher $C_3S$ and/or $C_3A$ content may be used, ground to a specific surface area that is typically 50-80% higher. The gypsum level may also be slightly increased. This gives the concrete using this Type III of cement a three day compressive strength equal to the seven day compressive strength of Types I and II. The Type III seven day compressive strength is almost equal to the 28-day compressive strengths of Types I and II, the downside being that the six month strength of Type III is the same or slightly less than that of Types I and II. Type IV Portland cement is generally known for its low heat of hydration. The typical compound compositions of this Type IV by weight relative to the total weight of the cement are: 28% ($C_3S$), 49% ($C_2S$), 4% ($C_3A$), 12% ($C_4AF$), 1.8% (MgO), 1.9% ($SO_3$), 0.9% ignition loss, and 0.8% free CaO. The percentages of ($C_2S$) and ($C_4AF$) are relatively high and ($C_3S$) and ($C_3A$) are relatively low. A limitation on this type of composition is that the maximum percentage of ($C_3A$) is 7% and the maximum percentage of ($C_3S$) is 35%. This causes the heat given off by the hydration reaction to develop at a slower rate. However, as a consequence the strength of concrete using this type develops slowly, after one to two years the strength is higher than other types after full curing. Type V Portland cement is used where sulfate resistance is important. The typical compound compositions of this Type V by weight relative to the total weight of the cement are: 38% ($C_3S$), 43% ($C_2S$), 4% ($C_3A$), 9% ($C_4AF$), 1.9% (MgO), 1.8% ($SO_3$), 0.9% ignition loss, and 0.8% free CaO. This cement has a very low ($C_3A$) composition which accounts for its high sulfate resistance. The maximum content of ($C_3A$) allowed is 5% for Type V Portland cement. Another limitation is that the ($C_4AF$)+2($C_3A$) composition cannot exceed 20%/a. This Type V is used in concrete to be exposed to alkali soil and ground water sulfates which react with ($C_3A$) causing disruptive expansion. Types IA, IIA, and IIIA have the same composition as Types I, II, and III with an air-entraining agent ground into the mix. Types II(MH) and II(MH)A have a similar composition to Types II and IIA, but with a mild heat. In terms of the present disclosure, the cement of the concrete composition may be Portland cement, and may be an ASTM C150 Type I Portland cement, an ASTM C150 Type II Portland cement, an ASTM C150 Type II Portland cement, an ASTM C150 Type IV Portland cement, an ASTM C150 Type V Portland cement, a Type IA Portland cement, a Type IIA Portland cement, a Type IIIA Portland cement, a Type II(MH) Portland cement, a type II(MH)A Portland cement or mixtures thereof, preferably an ASTM C150 Type I Portland cement.

EN 197-1 defines five classes of common cement that comprise Portland cement as a main constituent. These classes differ from the ASTM classes. CEM Class I Portland cement comprises Portland cement and up to 5 wt % relative to the total weight of the cement of minor additional constituents. CEM Class II Portland-composite cement comprises Portland cement and up to 35 wt % relative to the total weight of the cement of other single constituents. CEM Class III blast furnace cement comprises Portland cement and higher percentages of blast furnace slag. CEM Class IV pozzolanic cement comprises Portland cement and up to 55% of pozzolanic constituents (i.e. volcanic ash). CEM Class V composite cement comprises Portland cement, blast furnace slag or fly ash and pozzolana. Constituents that are permitted in Portland-composite cements are artificial pozzolans (i.e. blast furnace slag, silica fume, and fly ashes) or natural pozzolans (i.e. siliceous or siliceous aluminous materials such as volcanic ash glasses, calcined clays and shale). In terms of the present disclosure, the cement of the concrete composition may be Portland cement, and may be a CEM Class I cement, a CEM Class II cement, a CEM Class III cement, a CEM Class IV cement, a CEM Class V cement or mixtures thereof.

It is equally envisaged, that the present disclosure may be adapted to incorporate white Portland cement. White Portland cement or white ordinary Portland cement (WOPC) is similar to ordinary grey Portland cement in all respects except for its high degree of whiteness. The main requirement is to have low iron content which should be less than 0.5 wt % relative to the total weight of the cement expressed as $Fe_2O_3$ for white cement and less than 0.9 wt % for off-white cement. In certain embodiments, the iron oxide as ferrous oxide (FeO) obtained via slight reducing conditions (zero excess oxygen in the kiln) may give the clinker and cement a green tinge. Other metals including, but not limited to, Cr, Mn, Ti, etc. can also in trace content give color tinges to the cement of the present disclosure.

It is equally envisaged that the structural lightweight concrete composition of the present disclosure may be adapted to comprise other cements. Exemplary suitable cements that may be used in addition to, or in lieu of a Portland cement or an ASTM C150 Type I Portland cement include, but are not limited to, Portland cement blends such as Portland blast furnace slag cement (or blast furnace cement), Portland fly ash cement, Portland pozzolan cement, Portland silica fume cement, masonry cements, expansive cements, white blended cements, colored cements, very finely ground cements, pozzolan lime cements, slag lime cements, supersulfated cements, calcium sulfoaluminate cements, "natural" cements and geopolymer cements, and the like and mixtures thereof.

As used herein, specific gravity is the ratio of the density of a substance to the density of a reference substance; equivalently, it is the ratio of the mass of a substance to the mass of a reference substance for the same given volume. Apparent specific gravity is the ratio of the weight of a volume of the substance to the weight of an equal volume of the reference substance. As used herein, the reference substance is water at a temperature 2-25° C., preferably 4-22° C. and a pressure of approximately 1 atm (~101 kPa). In a preferred embodiment, the structural lightweight concrete composition of the present disclosure comprises cement having a specific gravity of 2.0-4.0, preferably 2.5-3.5, preferably 2.75-3.4, preferably 3.0-3.3, preferably 3.1-3.2, or about 3.15. In a preferred embodiment, the structural lightweight concrete composition of the present disclosure has a weight percentage of the cement ranging from 20-30% relative to the total weight of the composition, preferably 22-28%, preferably 23-26%, preferably 23-25%, or about 24% relative to the total weight of the structural lightweight concrete composition. In a preferred embodiment, the structural lightweight concrete composition of the present disclosure has cement present in the composition at 300-500 kg/m³ relative to the total volume of the composition, preferably 320-480 kg/m³, preferably 340-460 kg/m³, preferably 360-440 kg/m³, preferably 380-420 kg/m³, or about 400 kg/m³ relative to the total volume of the composition.

The structural lightweight concrete composition of the present disclosure also comprises water. Cement sets when mixed with water by way of a complex series of chemical reactions. The different constituents slowly crystallize and the interlocking of their crystals gives cement its strength. Carbon dioxide is slowly absorbed to convert the Portlandite ($Ca(OH)_2$) into soluble calcium carbonate. When water is mixed with cement, the product sets in a few hours and hardens over a period of weeks. These processes can vary widely depending on the mix used and the conditions of curing the product. After the initial setting, immersion in warm water will speed up setting; in some embodiments gypsum may be added as an inhibitor to prevent flash setting. In principle, the strength continues to rise slowly as long as water is available for continued hydration, but concrete is usually allowed to dry out after a few weeks causing strength growth to stop. In a preferred embodiment, the structural lightweight concrete composition of the present disclosure has a weight percentage of the water ranging from 10-20% relative to the total weight of the composition, preferably 12-20%, preferably 14-20%, preferably 15-19%, preferably 16-18% relative to the total weight of the structural lightweight concrete composition.

In a preferred embodiment, the structural lightweight concrete composition of the present disclosure has a weight ratio of water to cement in the range of 0.33-0.8, preferably 0.33-0.75, preferably 0.33-0.70, preferably 0.33-0.65, preferably 0.33-0.6, preferably 0.33-0.55, preferably 0.35-0.50, preferably 0.375-0.45, or about 0.4 and is sufficient to affect hydraulic setting of the cement. A lower water to cement ratio yields a stronger, more durable concrete, whereas more water gives a freer flowing concrete with a higher slump. Impure water can be used to make the concrete herein, but can cause problems when setting or in causing premature failure of the structure. In a preferred embodiment, the water of the structural lightweight concrete composition of the present disclosure is potable water.

The structural lightweight concrete composition of the present disclosure also comprises aggregates. As used herein, "construction aggregate" or simply "aggregate" refers to a broad category of particulate material used in construction. Exemplary materials include, but are not limited to, sand, gravel, crushed stone, slag, recycled concrete, geosynthetic aggregates and the like. Aggregates are a component of composite materials, such as concrete; the aggregates serve as reinforcement to add strength to the overall composite material. The ASTM publishes a listing of specifications including, but not limited to, ASTM D 692 and ASTM D 1073 for various construction aggregate products, which by their individual design are suitable for specific construction purposes. The products include specific types of coarse and fine aggregate designed for such uses as additives to concrete mixes. Fine and coarse aggregates make up the bulk of a concrete mixture. Sand, natural gravel, and crushed stone are used mainly for this purpose. Recycled aggregates (from construction, demolition, and excavation waste) are increasingly used as partial replacements for natural aggregates, while a number of manufactured aggregates, including air-cooled blast furnace slag and bottom ash also find use. The presence of aggregate greatly increases the durability of concrete above that of cement, which is a brittle material in its pure state, and also reduces cost and controls cracking caused by temperature changes. Thus concrete is a true composite material. Sources of these basic materials can be grouped into three main areas: mining of mineral aggregate deposits (i.e. sand, gravel and stone), the use of waste slag from the manufacture of iron, steel and petroleum products or recycling of concrete (itself chiefly manufactured from mineral aggregates), and obtaining some materials that are used as specialty lightweight aggregates (i.e. clay, pumice, perlite, vermiculite).

Aggregates, from different sources, or produced by different methods, may differ considerably in particle shape, size and texture. Shape of the aggregates of the present disclosure may be cubical and reasonably regular, essentially rounded, or angular and irregular. Surface texture may range from relatively smooth with small exposed pores to irregular with small to large exposed pores. Particle shape and surface texture of both fine and coarse aggregates influence proportioning of mixtures in such factors as workability, pumpability, fine-to-coarse aggregate ratio, cement binder content, and water requirement.

The structural lightweight concrete composition of the present disclosure also comprises a fine aggregate. In a preferred embodiment, the structural lightweight concrete composition of the present disclosure comprises a fine aggregate having a specific gravity of 1.5-3.25, preferably 1.75-3.0, preferably 2.0-2.8, preferably 2.25-2.6. As used herein, water absorption refers to the penetration of water into aggregate particles with resulting increase in particle weight. In a preferred embodiment, the structural lightweight concrete composition of the present disclosure comprises a fine aggregate having a water absorption of 0.1-1.0%, preferably 0.2-0.8%, preferably 0.4-0.6%, or about 0.5%. In a preferred embodiment, the structural lightweight concrete composition of the present disclosure has a weight percentage of the fine aggregate ranging from 15-30% relative to the total weight of the composition, preferably 16-28%, preferably 17-25%, preferably 18-24%, preferably 19-23%, preferably 20-22% relative to the total weight of the structural lightweight concrete composition.

In a preferred embodiment, the fine aggregate is sand, preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. The second most common type of sand is calcium carbonate, for example aragonite. In terms of the present disclosure, the fine aggregate of the concrete composition may be silicon dioxide sand, preferably quarzitic silicon dioxide, preferably quarzitic sand, preferably dune sand.

In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm). ISO 14688 grades sands as fines, medium and coarse with ranges of 0.063 mm to 0.2 mm to 0.63 mm to 2.0 mm. Sand is also commonly divided into five subcategories based on size: very fine sand (0.0625-0.125 mm diameter), fine sand (0.125-0.250 mm diameter), medium sand (0.250-0.500 mm diameter), coarse sand (0.500-1.0 mm diameter) and very coarse sand (1.0-2.0 mm diameter). These categories based on the Krumbein phi scale, where size in $\phi=-\log_2 D$; wherein D is the particle size in mm. On this scale, for sand the value of $\phi$ varies from −1 to +4, with the divisions. In terms of the present disclosure, the fine aggregate of the concrete composition may be sand, and may be very fine sand, fine sand, medium sand, or even coarse sand, preferably very fine sand, fine sand or medium sand.

In a preferred embodiment, the fine aggregate of the concrete composition is sand with an average particle size of less than 700 µm, preferably less than 600 µm, preferably less than 500 µm, preferably less than 400 µm, preferably less than 300 µm, preferably less than 200 µm, preferably less than 100 µm, such as for example 500-700 µm, preferably 525-675 µm, preferably 550-650 µm, preferably 575-625 µm. As used herein, the coefficient of variation or relative standard deviation is expressed as a percentage and defined as the ratio of the particle size standard deviation (σ) to the particle size mean (µ) multiplied by 100. In a preferred embodiment, the fine aggregate of the concrete composition is sand having a coefficient of variation of less than 35%, preferably less than 30%, preferably less than 25%, preferably less than 20%, preferably less than 15%, preferably less than 10%. In a preferred embodiment, the fine aggregate of the concrete composition is sand having a particle size distribution ranging from 10% of the average particle size to 200% of the average particle size, preferably 50-150%, preferably 75-125%, preferably 80-120%, preferably 90-110%.

In a preferred embodiment, the structural lightweight concrete composition of the present disclosure comprises sand as fine aggregate and the sand comprises 80-95 wt % of silicon dioxide ($SiO_2$ or silica) relative to the total weight of the sand, preferably 85-94 wt %, preferably 88-93 wt %, preferably 90-92 wt % of $SiO_2$ relative to the total weight of the sand. The most common constituent of sand is silicon dioxide ($SiO_2$ or silica), usually in the form of quartz, which due to its chemical inertness and considerable hardness, is the most common mineral resistant to weathering. In a preferred embodiment, the structural lightweight concrete composition of the present disclosure comprises sand as fine aggregate and the sand further comprises ferric oxide ($Fe_2O_3$), aluminum oxide ($Al_2O_3$), magnesium oxide (MgO), and potassium oxide ($K_2O$). These compounds are generally present in less than 5 wt % relative to the total weight of the sand, preferably less than 4 wt %, preferably less than 3 wt %, such as for example 0.1-2.0 wt %, preferably 0.2-1.0 wt %, preferably 0.4-0.9 wt % relative to the total weight of the sand. Other impurities may be present in the sand including, but not limited to limestone, gypsum, sand stone, feldspar, granite, magnetite, chlorite, glauconite, basalts, iron, obsidian and the like or mixtures thereof.

It is equally envisaged that the structural lightweight concrete composition of the present disclosure may be adapted to comprise other fine aggregates. Exemplary suitable fine aggregates that may be used in addition to, or in lieu of sand or dune sand include, but are not limited to, mineral particles of natural or synthetic origin, pumice, expanded clays, expanded schists, expanded glasses, expanded aggregates based on marble, granite, slate, ceramic, and the like and mixtures thereof.

The structural lightweight concrete composition of the present disclosure also comprises a natural coarse aggregate. In a preferred embodiment, the structural lightweight concrete composition of the present disclosure comprises a natural coarse aggregate having a specific gravity of 0.2-2.8, preferably 0.3-2.6, preferably 0.5-2.2, preferably 0.8-2.0, preferably 1.2-1.8, preferably 1.4-1.6. In a preferred embodiment, the structural lightweight concrete composition of the present disclosure comprises a natural coarse aggregate having a water absorption of 1-80%, preferably 1.5-75%, preferably 2-50%, preferably 5-25%. In a preferred embodiment, the structural lightweight concrete composition of the present disclosure has a weight percentage of the natural coarse aggregate ranging from 20-45% relative to the total weight of the composition, preferably 25-40%, preferably 26-36%, preferably 28-34% relative to the total weight of the structural lightweight concrete composition.

In a preferred embodiment, the natural coarse aggregate comprises limestone. As used herein, limestone refers to a sedimentary rock composed largely of the minerals calcite and aragonite, which are different crystal forms or polymorphs of calcium carbonate ($CaCO_3$). In a preferred embodiment, the limestone comprises at least 50 wt % calcium carbonate relative to the total weight of the calcium carbonate, preferably at least 55 wt %, preferably at least 60 wt %, preferably at least 70 wt %, preferably at least 80 wt % relative to the total weight of the calcium carbonate and up to 20 wt % silicon dioxide relative to the total weight of the calcium carbonate, preferably up to 18 wt %, preferably up to 16 wt %, preferably up to 12 wt %, preferably up to 10 wt % silicon dioxide relative to the total weight of the calcium carbonate. In certain embodiments, the limestone may contain at least a few wt % of other materials including, but not limited to, quartz, feldspar, clay minerals, pyrite, siderite, chert and other minerals, preferably less than 2 wt %, preferably less than 1 wt %, preferably less than 0.5 wt % relative to the total weight of the calcium carbonate. In a preferred embodiment, the structural lightweight concrete composition of the present disclosure has a weight percentage of the natural coarse aggregate in the form of limestone ranging from 1-30% relative to the total weight of the composition, preferably 10-28%, preferably 12-25%, preferably 16-22% relative to the total weight of the structural lightweight concrete composition. In a preferred embodiment, the natural coarse aggregate comprises limestone with an average particle size in the range of 1-20 mm, preferably 5-20 mm, preferably 5-15 mm, preferably 10-15 mm, preferably 11-14 mm, preferably 12-13 mm.

In a preferred embodiment, the natural coarse aggregate comprises perlite. As used herein, perlite refers to an amorphous volcanic glass that has a relatively high water content, typically formed by the hydration of obsidian. It occurs naturally and has the unusual property of greatly expanding when heated sufficiently. The perlite of the present disclosure may refer to perlite or expanded perlite. Perlite softens when it reaches temperatures of 800-900° C. Water trapped in the structure of the material vaporizes and escapes, and this causes the expansion of the material to 7-16 times its original volume. In a preferred embodiment, the structural lightweight concrete composition of the present disclosure has a weight percentage of the natural coarse aggregate in the form of perlite ranging from 1-10% relative to the total weight of the composition, preferably 2-8%, preferably 3-7%, preferably 4-6% relative to the total weight of the structural lightweight concrete composition. In a preferred embodiment, the natural coarse aggregate comprises perlite with an average particle size of 1-10 mm, preferably 1.5-8 mm, preferably 2-6 mm, preferably 2.5-5 mm, preferably 3-4 mm. In a preferred embodiment, the natural coarse aggregate is perlite comprising 65-80 wt % $SiO_2$, preferably 70-75 wt % $SiO_2$ relative to the total weight of the perlite, 10-18 wt % $Al_2O_3$, preferably 12-15 wt % $Al_2O_3$ relative to the total weight of the perlite, 2-5 wt % $Na_2O$, preferably 3-4 wt % $Na_2O$ relative to the total weight of the perlite, and 2-6 wt % $K_2O$, preferably 3-5 wt % $K_2O$ relative to the total weight of the perlite. In certain embodiments, the perlite comprises various elements including, but not limited to calcium, iron, magnesium, and oxides thereof in less than 2 wt % relative to the total weight of the perlite, preferably less than 1 wt % relative to the total weight of the perlite.

In a preferred embodiment, the natural coarse aggregate comprises scoria. As used herein, "scoria" or "cinder" refers to a highly vesicular (pitted with many cavities or vesicles), dark colored volcanic rock that may or may not contain crystals (phenocrysts). It is typically dark in color (generally dark brown, black or purplish red) and basaltic or andesitic in composition. Scoria is relatively low in density as a result of its numerous macroscopic ellipsoidal vesicles. The holes or vesicles form when gasses that were dissolved in the magma come out of solution as it erupts, creating bubbles in the molten rock, some of which are frozen in place as the rock cools and solidifies. Scoria differs from pumice, another vesicular volcanic rock, in having larger vesicles and thicker vesicle walls, and hence a higher density. In a preferred embodiment, the structural lightweight concrete composition of the present disclosure has a weight percentage of the natural coarse aggregate in the form of scoria ranging from 1-30% relative to the total weight of the composition, preferably 5-25%, preferably 10-20%, preferably 12-18%, preferably 14-16% relative to the total weight of the structural lightweight concrete composition. In a preferred embodiment, the natural coarse aggregate comprises scoria with an average particle size of 1-30 mm, preferably 2-25 mm, preferably 3-20 mm, preferably 4-15 mm, preferably 4-10 mm.

In certain embodiments, the natural coarse aggregate comprises mixtures of limestone, perlite and scoria, mixtures of perlite and scoria, mixtures of limestone and scoria and mixtures of limestone and perlite. In certain embodiments, the natural coarse aggregate comprises 30-80 wt % limestone relative to the total weight of the natural coarse aggregate, preferably 40-77 wt %, preferably 50-75 wt % limestone relative to the total weight of the natural coarse aggregate. In certain embodiments, the natural coarse aggregate comprises 10-30 wt % limestone relative to the total weight of the natural coarse aggregate. In certain embodiments, the natural coarse aggregate comprise 30-90 wt % scoria relative to the total weight of the natural coarse aggregate, preferably 33-50 wt %, preferably 35-45 wt % scoria relative to the total weight of the natural coarse aggregate. In certain embodiments, the natural coarse aggregate comprise 10-25 wt % perlite relative to the total weight of the natural coarse aggregate, preferably 11-22 wt %, preferably 15-20 wt % perlite relative to the total weight of the natural coarse aggregate.

It is equally envisaged that the structural lightweight concrete composition of the present disclosure may be adapted to comprise other natural coarse aggregates. Exemplary natural coarse aggregates that may be used in addition to, or in lieu of limestone, scoria, and/or perlite include, but are not limited to, pumice, shale, clays, slate, expanded clays, vermiculite, diatomite, schists, expanded schist and the like and mixtures thereof.

The structural lightweight concrete composition of the present disclosure also comprises a synthetic coarse aggregate comprising a polymeric material. As used herein, polymeric material refers to a large synthetic molecule or macromolecule composed of many repeated subunits. In a preferred embodiment, the structural lightweight concrete composition of the present disclosure comprises a synthetic coarse aggregate comprising a polymeric material having a specific gravity of 0.5-0.99, preferably 0.6-0.95, preferably 0.7-0.92, preferably 0.8-0.9, preferably 0.85-0.89. In a preferred embodiment, the structural lightweight concrete composition of the present disclosure comprises a synthetic coarse aggregate comprising a polymeric material having a water absorption of less than 0.25%, preferably less than 0.10%, preferably less than 0.05%, preferably less than 0.01%. In a preferred embodiment, the structural lightweight concrete composition of the present disclosure has a weight percentage of the synthetic coarse aggregate comprising a polymeric material ranging from 2-15% relative to the total weight of the composition, preferably 3-10%, preferably 4-9%, preferably 5-8% relative to the total weight of the structural lightweight concrete composition.

In a preferred embodiment, the synthetic coarse aggregate comprising a polymeric material is spherical polypropylene beads. In a preferred embodiment, the polypropylene beads are substantially spherical with an average particle size of 2-15 mm, preferably 2.5-12 mm, preferably 3-10 mm, preferably 4-8 mm. In a preferred embodiment, the synthetic coarse aggregate comprising a polymeric material of the concrete composition is polypropylene beads having a coefficient of variation of less than 35%, preferably less than 30%, preferably less than 25%, preferably less than 20%, preferably less than 15%, preferably less than 10%. In a preferred embodiment, the synthetic coarse aggregate comprising a polymeric material of the concrete composition is polypropylene beads having a particle size distribution ranging from 10% of the average particle size to 200% of the average particle size, preferably 50-150%, preferably 75-125%, preferably 80-120%, preferably 90-110%. In certain embodiments, the synthetic coarse aggregate comprising a polymeric material may further comprise a variety of polymer additives including, but not limited to, stabilizers, processing aids, plasticizers, anti-statics, blowing agents, fillers, coupling agents and the like or mixtures thereof.

As used herein polypropylene (PP, polypropene) is a thermoplastic addition polymer made from the monomer propylene. The relative orientation of each methyl group relative to the methyl group in the neighboring monomer has a strong effect on the polymer and is termed tacticity. Types of tacticity include isotactic when all methyl groups are positioned at the same side with respect to the backbone of the polymer chain, syndiotactic when the positions of the methyl groups alternate and atactic when the methyl groups of the polypropylene exhibit no pattern or preferred orientation. In terms of the present disclosure the polypropylene may be isotactic, syndiotactic or atactic. Polypropylene may be produced in a manner resulting in a wide molecular weight distribution. In one embodiment, the polypropylene of the present disclosure has an average molecular weight of 2-300 kDa, preferably 5-200 kDa, preferably 10-150 kDa, preferably 10-75 kDa, preferably 15-50 kDa, preferably 20-40 kDa. The degree of polymerization (DP) is defined as the number of monomeric units in a macromolecule or polymer. In one embodiment, the polypropylene of the present disclosure has a degree of polymerization in the range of 100-2500, preferably 150-1500, preferably 200-750, preferably 250-500.

It is equally envisaged that the structural lightweight concrete composition of the present disclosure may be adapted to comprise other synthetic coarse aggregates comprising a polymeric material. Exemplary polymeric materials or plastic materials that may be used in addition to, or in lieu of polypropylene include, but are not limited to, polyethylene, polystyrene, polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like and copolymers and mixtures thereof. In a preferred embodiment, the synthetic coarse aggregate comprising a polymeric material is a geosynthetic aggregate made from recycled material and recyclable polymers and/or plastics including petrochemical byproducts, such as polystyrene, polyethylene, polypropylene and the like.

The structural lightweight concrete composition of the present disclosure also comprises an industrial waste byproduct in the form of fine particles. As used herein, an "industrial waste byproduct" refers to any waste produced by industrial activity which includes any material that is rendered useless during a manufacturing process, such as for example factories, industries, mills, and mining operations. In a preferred embodiment, the structural lightweight concrete composition of the present disclosure comprises an industrial waste byproduct in the form of fine particles having a specific gravity of 0.4-2.6, preferably 0.5-2.2, preferably 0.8-1.8. In a preferred embodiment, the specific gravity of the industrial waste byproduct is less than the specific gravity of the fine aggregate. In a preferred embodiment, the structural lightweight concrete composition of the present disclosure comprises an industrial waste byproduct in the form of fine particles having a water absorption of 0.5-2.0%, preferably 0.75-1.75%, preferably 0.9-1.6%, preferably 1.0-1.5%. In a preferred embodiment, the structural lightweight concrete composition of the present disclosure has a weight percentage of the industrial waste byproduct in the form of fine particles ranging from 0.5-10% relative to the total weight of the composition, preferably 1-8%, preferably 2-6%, preferably 3-4% relative to the total weight of the structural lightweight concrete composition. Exemplary industrial waste byproducts may include, but are not limited to silica fume, a variety of ashes (heavy oil ash, fly ash), a variety of slags (blast furnace slag, electric arc furnace slag), petrochemical production byproducts, concrete plant byproducts, power plant byproducts and the like.

Mineral admixtures refer to very fine grained inorganic materials that have pozzolanic or latent hydraulic properties that are added to a concrete mix to improve the properties of the concrete. The use of mineral admixtures as partial replacements for cements lowers costs, improves concrete properties and allows for recycling waste. In certain embodiments, the industrial waste byproduct in the form of fine particles may be considered a mineral admixture. In a preferred embodiment, the industrial waste byproduct is at least one selected from the group consisting of silica fume and heavy oil ash.

As used herein, silica fume (or microsilica) refers to an amorphous (non-crystalline) polymorph of silicon dioxide, silica. It is an ultrafine powder collected as a by-product in the carbothermic reduction of high purity quartz with carbonaceous materials (i.e. coal, coke, wood) in electric arc furnaces in the production of silicon and ferrosilicon alloys. Silica fume is approximately 100 times smaller than the average cement particle resulting in a higher surface to volume ratio and a relatively fast pozzolanic reaction. Silica fume is advantageous in concrete compositions to improve properties including, but not limited to, compressive strength, bond strength, and abrasion resistance. These improvements stem from both the mechanical improvements result from the addition of a very fine powder as well as from the pozzolanic reactions between the silica fume and free calcium hydroxide in the composition. As used herein, silica fume is not to be used synonymously with fumed silica (pyrogenic silica). The production process, particle characteristics and fields of application of fumed silica are all different from those of silica fume.

In a preferred embodiment, the industrial waste byproduct is silica fume having a BET specific surface area of 5000-50000 $m^2$/kg, preferably 10000-40000 $m^2$/kg, preferably 15000-30000 $m^2$/kg. In a preferred embodiment, the industrial waste byproduct is silica fume comprising generally spherical particles with an average particle diameter of less than 1000 nm, preferably less than 800 nm, preferably less than 600 nm, preferably less than 400 nm, preferably less than 200 nm, such as for example 50-300 nm, preferably 75-250 nm, preferably 100-200 nm, preferably 125-175 nm, or about 150 nm. In a preferred embodiment, the industrial waste byproduct is silica fume as defined using the standard specifications ASTM C1240 and/or EN 13263 comprising greater than 90% by weight silicon dioxide ($SiO_2$) relative to the total weight of the silica fume, preferably greater than 91%, preferably greater than 92%, preferably greater than 93%, preferably greater than 94%, preferably greater than 95% by weight silicon dioxide relative to the total weight of the silica fume. In certain embodiments, the silica fume comprises various elements including, but not limited to, calcium, aluminum, iron, magnesium, potassium, sodium, sulfur and oxides thereof in less than 10 wt % relative to the total weight of the silica fume, preferably less than 5 wt %, preferably less than 2 wt %, preferably less than 1 wt % relative to the total weight of the silica fume.

As used herein, "heavy oil ash" refers to a residue resulting from the combustion of heavy oil or cracked oil. Heavy oil is generally defined as fuel oil having relatively long hydrocarbon chains, such as for example, carbon lengths of between 8-70 carbon atoms, preferably 12-70 carbon atoms, preferably 20-70 carbon atoms. As defined by ASTM, heavy fuel oil can be classified as a No. 5 or No. 6 fuel oil. Combustion of heavy fuel oil produces residue, including ash. Heavy oil ash is a black powder type of waste material that results from the burning of heavy oil. Heavy oil ash has unique characteristics compared to other types of ash.

In a preferred embodiment, the industrial waste byproduct is heavy oil ash comprising greater than 90% by weight carbon relative to the total weight of the heavy ash, preferably greater than 91%, preferably greater than 92%, preferably greater than 93%, preferably greater than 94%, preferably greater than 95% by weight carbon relative to the total weight of the heavy ash. In certain embodiments, the heavy oil ash comprises various elements including, but not limited to, silicon, calcium, aluminum, iron, magnesium, potassium, sodium, vanadium, sulfur and oxides thereof in less than 10 wt % relative to the total weight of the heavy oil ash, preferably less than 5 wt %, preferably less than 2 wt %, preferably less than 1 wt % relative to the total weight of the heavy oil ash. In a preferred embodiment, the industrial waste byproduct is heavy oil ash with an average particle size of less than 20-100 μm, preferably less than 30-80 μm, preferably less than 40-60 μm, preferably less than 45-50 μm, such as for example less than 100 μm, preferably less than 90 μm, preferably less than 80 μm, preferably less than 70 μm, preferably less than 60 μm, preferably less than 50 μm.

It is equally envisaged that the structural lightweight concrete composition of the present disclosure may be adapted to comprise other industrial waste byproducts in the form of fine particles. Exemplary suitable industrial waste byproducts that may be used in addition to, or in lieu of silica fume and/or heavy oil ash include, but are not limited to, limestone fillers, siliceous fillers, fly ash, ground and/or granulated blast furnace slags, metakaolins and the like and mixtures thereof.

The structural lightweight concrete composition of the present disclosure also comprises a superplasticizer. Chemical admixtures refer to materials in the form of powder or fluids that are added to the concrete to give it certain characteristics not obtainable with plain concrete mixes. In certain embodiments, admixtures may be added to the concrete at the time of batching and/or mixing. As used herein, a "superplasticizer" or "high range water reducer" refers to a type of chemical admixture used where a well-dispersed particle suspension is required. These polymers are used as dispersants to avoid particle segregation and to improve the flow characteristics of suspensions such as in concrete applications. As used herein, a "plasticizer" or "dispersant" is an additive that increases the plasticity or fluidity of a material. Plasticizers increase the workability of "fresh" concrete, allowing it to be placed more easily, with less consolidating effort. A superplasticizer refers to a class of plasticizers that have fewer deleterious effects and can be used to increase workability more than is practical with traditional plasticizers. The addition of a superplasticizer to concrete or mortar allows the reduction of the water content and water to cement ratio, while not affecting the workability of the mixture. This effect drastically improves the performance of the hardening fresh paste, the strength of concrete increases when the water to cement ratio decreases. Such treatment improves the strength and durability characteristics of the concrete and enables the production of self-consolidating concrete and high performance concrete.

In a preferred embodiment, the superplasticizer is a polycarboxylate, such as for example a polycarboxylate derivative with polyethylene oxide side chains, preferably the superplasticizer is a polycarboxylate ether (PCE) superplasticizer, such as for example the commercially available Glenium 51. Polycarboxylate ether-based superplasticizers allow a significant water reduction at a relatively low dosage as a result of their chemical structure which enables good particle dispersion. Polycarboxylate ether-based superplasticizers are composed of a methoxy-polyethylene glycol copolymer (side chain) grafted with methacrylic acid copolymer (main chain). The carboxylate group ($COO^-Na^+$) dissociates in water, providing a negative charge along the polycarboxylate ether backbone. The polyethylene oxide (PEO or MPEG) group affords a non-uniform distribution of the electron cloud, which gives a chemical polarity to the side chains. The number and the length of side chains are flexible parameters that are easy to change. When the side chains have a large amount of ethylene oxide units, the high molar mass lowers the charge density of the polymer, which decreases performance in cement suspensions. To balance both parameters, long side chain and high charge density, it is often necessary to keep the number of main chain units much higher than the number of side chain units. The negatively charged polycarboxylate ether backbone permits adsorption onto positively charged cations in a cement water system. The adsorption of the polymer and its $COO^-$ groups changes the zeta potential of the suspended cement particles yielding electrostatic repulsion forces and steric hindrance.

It is equally envisaged that the structural lightweight concrete composition of the present disclosure may be adapted to comprise other superplasticizers. Exemplary suitable superplasticizers that may be used in addition to, or in lieu of a polycarboxylate ether based superplasticizer include, but are not limited to, alkyl citrates, sulfonated naphthalene, sulfonated alene, sulfonated melamine, ligno-sulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

In a preferred embodiment, the structural lightweight concrete composition of the present disclosure comprises a superplasticizer having a specific gravity of 1.0-2.0, preferably 1.05-1.75, preferably 1.10-1.50, preferably 1.20-1.40. In a preferred embodiment, the structural lightweight concrete composition of the present disclosure has a weight percentage of the superplasticizer ranging from 0.1-2.0% relative to the total weight of the composition, preferably 0.2-1.6%, preferably 0.3-1.5%, preferably 0.4-1.4%, preferably 0.5-1.2%, preferably 0.6-1.0% relative to the total weight of the structural lightweight concrete composition.

In certain embodiments, the structural lightweight concrete composition of the present disclosure may further comprise one or more additional chemical admixtures. Exemplary additional chemical admixtures include, but are not limited to, accelerators, retarders, air entraining agents, pigments, corrosion inhibitors, bonding agents, pumping aids and the like. Accelerators speed up the hydration (hardening) of concrete and may be especially useful for modifying the properties of concrete in cold weather. Exemplary accelerators include, but are not limited to, $CaCl_2$, $Ca(NO_3)_2$ and $NaNO_3$. Retarders, such as polyol retarders, slow the hydration of concrete and may be used in large or difficult pours where partial setting before the pour is complete is undesirable. Exemplary retarders include, but are not limited to, sugar, sucrose, sodium gluconate, glucose, citric acid, tartaric acid and the like. Air entraining agents (i.e. surfactants) add and entrain air bubbles in the concrete, which reduces damage during freeze-thaw cycles, increasing durability. Entrained air entails a reduction in strength and if too much air becomes trapped in the mixing defoamers may be used to encourage the agglomeration of air bubbles causing them to rise to the surface and disperse. Pigments may be used to change the color of the concrete, for aesthetics. Corrosion inhibitors may be used to minimize the corrosion of metal (i.e. steel) that may be used as reinforcement in the concrete. Bonding agents (typically a polymer) may be used to create a bond between old and new concrete with wide temperature tolerance and corrosion resistance. Pumping aids improve pumpability, thicken the paste and reduce separation and bleeding.

In certain embodiments, the structural lightweight concrete composition of the present disclosure may further comprise a viscosifying agent to modify the rheological properties of the composition. Exemplary viscosifying agents include, but are not limited to, cellulose ethers, polysaccharides, hydroxyalkylcelluloses, hydroxyethylcelluloses, methylcellulose, carboxymethylcellulose, hydroxyethylcellulose or ethylhydroxyethylcellulose, polyethylene oxides, polyvinyl alcohols, polyamides and the like or mixtures thereof.

In certain embodiments, the structural lightweight concrete composition of the present disclosure may further comprise one or more additional reinforcements. Concrete is strong in compression, as the aggregate efficiently carries the compression load. However, it is weak in tension as the cement holding the aggregate in place can crack, allowing the structure to fail. Reinforced concretes may add exemplary materials including, but not limited to, steel reinforcing bars, steel fibers, glass fibers, carbon fibers, carbon nanofibers, plastic fibers and the like or mixtures thereof to aid in carrying tensile loads.

As used herein, unit weight (γ, also known as specific weight) is the weight per unit volume of a material. The unit weight of structural lightweight concrete composition of the present disclosure will vary depending on the composition of the aggregates and the unit weights of the constituent aggregates. In a preferred embodiment, the structural lightweight concrete composition of the present disclosure in any of its embodiments has a unit weight in the range of 1600-1900 kg/m$^3$ after setting for up to 30 days, preferably up to 28 days, preferably 1650-1850 kg/m$^3$, preferably 1700-1825 kg/m$^3$, preferably 1750-1800 kg/m$^3$ after setting for up to 30 days, preferably up to 28 days.

As used herein, compressive strength is the capacity of a material or structure to withstand loads tending to reduce size, as opposed to tensile strength, which withstands loads tending to elongate. In other words, compressive strength resists compression (being pushed together), whereas tensile strength resists tension (being pulled apart). Compressive strength can be measured by plotting applied force against deformation in a testing machine, such as a universal testing machine. In a preferred embodiment, the structural lightweight concrete composition of the present disclosure in any of its embodiments has a compressive strength in the range of 20-40 MPa after setting for up to 30 days, preferably up to 28 days, preferably up to 14 days, preferably up to 7 days, preferably 21-35 MPa, preferably 22-30 MPa, preferably 23-28 MPa, preferably 24-26 MPa after setting for up to 30 days, preferably up to 28 days, preferably up to 14 days, preferably up to 7 days.

As used herein, thermal conductivity is the property of a material to conduct heat or alternatively the ability of a material to absorb heat. It can also be defined as the quantity of heat transmitted through a unit thickness of a material due to a unit temperature or the ratio between the heat flux and the temperature gradient. Heat transfer occurs at a lower rate across materials of low thermal conductivity than across materials of high thermal conductivity. Correspondingly, materials of high thermal conductivity are widely used in heat sink applications and materials of low thermal conductivity are used as thermal insulation. The SI units for thermal conductivity is measured in watts per meter kelvin (W/(m·K)). The conductivity of concrete depends on its composition. In a preferred embodiment, the structural lightweight concrete composition of the present disclosure in any of its embodiments has a thermal conductivity in the range of 0.3-0.7 W/(m·K), after setting for up to 30 days, preferably up to 28 days, preferably 0.35-0.65 W/(m·K), preferably 0.36-0.60 W/(m·K), preferably 0.38-0.55 W/(m·K), preferably 0.40-0.50 W/(m·K), preferably 0.41-0.48 W/(m·K) after setting for up to 30 days, preferably up to 28 days. In a preferred embodiment, the structural lightweight concrete composition of the present disclosure in any of its embodiments has a thermal conductivity that is up to 80% less than the thermal conductivity of a normal weight concrete composition, preferably up to 70%, preferably up to 60%, preferably up to 55%, preferably up to 50%, preferably up to 45%, preferably up to 40% less than the thermal conductivity of a normal weight concrete composition.

According to a second aspect, the present disclosure relates to a method for producing a cast concrete product comprising the structural lightweight concrete composition of the present disclosure in any of its embodiments comprising i) mixing the cement, the fine aggregate, the natural coarse aggregate, the synthetic coarse aggregate and the industrial waste byproduct in the form of fine particles to form a solid cement mixture, ii) adding water and a superplasticizer to the cement mixture to affect hydraulic setting while maintaining a slump in the range of 50-100 mm to form a fluid concrete mixture, and iii) casting the concrete mixture in a mold to produce a cast concrete product after setting.

Concrete production is the process of mixing together the various ingredients (water, aggregate, cement, additives, etc.) to produce concrete. Concrete production is time sensitive. Thorough mixing is essential for the production of uniform high quality concrete. Equipment and methods should be capable of effectively mixing concrete materials containing the largest specified aggregate to produce uniform mixtures. Exemplary equipment includes, but is not limited to concrete drum mixer, a volumetric concrete mixer, or simple concrete mixer. There is a wide variety of equipment for processing concrete from hand tools to heavy industrial machinery. Whatever the equipment used the objective is to produce the desired material and ingredients must be properly mixed, placed, shaped and retained within the time constraints.

As used herein, "workability" refers to the ability of a fresh fluid concrete mix to fill the form/mold properly, optionally with vibration. Workability depends on water content, aggregate (shape and size distribution), cementitious content and level of hydration, it can be modified by the addition of a superplasticizer. Workability can be measured by the concrete slump test, a simplistic measure of the plasticity of a fresh batch of concrete following the ASTM C 143 or EN 12350-2 test standards. In one embodiment, slump is measured by filling an "Abram's cone" with a sample from a fresh batch of concrete. The cone is placed with the wide end down onto a level surface; it is then filled in three layers of equal volume, with each layer being tamped with a steel rod to consolidate the layer. When the cone is carefully lifted off, the enclosed material slumps a certain amount due to gravity. A relatively dry sample slumps less than a relatively wet sample. In a preferred embodiment, water and superplasticizer are added in dosages and at a rate to maintain a slump of 50-150 mm, preferably 75-125 mm, preferably about 100 mm. In certain embodiments, one or more aggregates or a portion of one or more aggregates may be prewetted and/or saturated with water. In certain embodiments, a separate paste mixing method may be used where cement and water are mixed into a paste such as by a high speed shear type mixer before combining these materials with aggregates or additives, preferably at a water to cement ratio of less than 0.45, preferably less than 0.4, preferably less than 0.35. In certain embodiments, up to half the batch water may be added to the solid ingredients and this premix may be blended with the remaining batch water and superplasticizer in dosages to maintain optimal slump.

As used herein, casting refers to the process in which a fluid material (i.e. the concrete mixture) is poured into a mold, which contains a hollow cavity of the desired shape, and then allowed to solidify. The solidified part is also known as a casting, which is ejected, demolded or broken out of the mold to complete the process. Concrete is prepared as a viscous fluid so that it may be poured into forms to give the concrete its desired shape. There are many different ways in which concrete formwork can be prepared, such as slip forming and steel plate construction or factory setting in the manufacturing of precast concrete products. In certain embodiments, the method may further comprise curing procedures. Cement is hydraulic and water allows it to gain strength, curing allows calcium-silicate hydrate (C—S—H) to form. Hydration and hardening of concrete is critical in the first 3 days, in approximately 4 weeks, typically over 90% of the final concrete strength is reached. During this period concrete must be kept under controlled temperature and humid atmosphere. In a preferred embodiment, this is achieved by spraying or ponding the concrete surfaces with water. In a preferred embodiment, the cast concrete products are demolded after greater than 6 hours, preferably greater than 12 hours, preferably greater than 24 hours and submerged in a curing chamber (or water tank) maintaining at least 50% humidity, preferably at least 75% humidity, preferably at least 90% humidity, preferably at least 100% humidity for greater than 7 days, preferably greater than 14 days, preferably greater than 28 days. In certain embodiments, the curing procedure may further comprise increases in temperature or pressure for intermittent periods of time depending on the desired properties of the cast concrete product.

According to a third aspect, the present disclosure relates to a cast concrete product comprising the structural lightweight concrete composition of the present disclosure in any of its embodiments. As a construction material, concrete can be cast in almost any shape desired, and once hardened, can become a structural (load bearing) element. Concrete can be used in the construction of structural elements like panels, beams, pavements, street furniture, or may make cast in situ concrete for building superstructures like navigation locks, large mat foundations, large breakwaters, roads and dams. These may be supplied with concrete mixed on site, or may be provided with "ready mixed" concrete made at permanent mixing sites.

In one embodiment, the cast concrete product may be a concrete masonry unit. As used herein, a concrete masonry unit (CMU) also known as cinder block, hollow block, concrete brick, concrete block, cement block, besser block, or breeze block refers to a large rectangular block used in building construction. Concrete blocks may be produced with hollow centers (cores) to reduce weight or improve insulation. The use of blockwork allows structures to be built in the traditional masonry style with layers (or courses) of staggered blocks. Concrete blocks may come in many sizes, for example 350-450 mm by 180-220 mm by 100-200 mm. Concrete block cores are typically tapered so that the top surface of the block (as laid) has a greater surface area on which to spread a mortar bed. Most concrete masonry units have two cores, but three and four core units may also be produced. A core also allows for the insertion of steel reinforcement, tying individual blocks together in the assembly, aimed towards greatly increased strength. To hold the reinforcement in proper position and to bond the block to the reinforcement, the cores must be filled with grout (i.e. concrete). A variety of specialized shapes of concrete masonry units exist to allow special construction features. U-shaped blocks or knockout blocks may have notches to allow the construction of bond beams or lintel assemblies. Blocks with a channel on the end or "jamb blocks" allow doors to be secured to wall assemblies. Blocks with grooved ends permit the construction of control joints allowing a filler to be anchored between the block ends. Other features such as "bullnoses" may be incorporated. A wide variety of decorative profiles also exist.

Concrete blocks, when built in tandem with concrete columns and tie beams and reinforced with rebar, are a very common building material for the load bearing walls of buildings, in what is termed "concrete block structure" (CBS) construction. Houses typically employ a concrete foundation and slab with a concrete block wall on the perimeter. Large buildings typically use large amounts of concrete block; for even larger buildings, concrete blocks supplement steel I-beams. Concrete masonry can be used as a structural element in addition to being used as an architectural element. Ungrouted, partially grouted, and fully grouted walls are all feasible. Reinforcement bars can be used both vertically and horizontally inside the concrete masonry unit to strengthen the wall and result in better structural performance.

The examples below are intended to further illustrate methods and protocols for preparing and characterizing the structural lightweight concrete compositions of the present disclosure. Further, they are intended to illustrate assessing the properties of these structural lightweight concrete compositions. They are not intended to limit the scope of the claims.

Example 1

General Methods and Materials

Prepared specimens were tested to assess their mechanical and thermal properties as well as durability characteristics. The following materials were utilized in the preparation of the structural lightweight concrete mixtures: i) Portland cement, ii) fine aggregate, iii) coarse aggregate, iv) expanded perlite, v) natural lightweight aggregate (Scoria), vi) polypropylene beads, vii) heavy oil ash, viii) silica fume, and ix) superplasticizer. The properties of the above materials are described below.

Potable water was used in the preparation of all the mixtures and their curing. A superplasticizer was used to obtain the required slump (100±25 mm) in each mixture. The dosages of the superplasticizer were between 0.5 and 1.2% of the weight of the cement. The preferred superplasticizer was Glenium 51 ®. Glenium 51 is a brown liquid in appearance with a specific gravity at 20° C. of 1.08±0.02 g/cm$^3$, a pH value at 20° C. of 7.0±1.0, an alkali content of ≤5.0%0/and a chloride content of ≤0.1%. ASTM C 150 Type I Portland cement with a specific gravity of 3.15 was utilized in all the mixtures. Table 1 displays the chemical composition of the cement used. Dune sand with a specific gravity of 2.56 and water absorption of 0.5% was used as the fine aggregate in all the mixtures. Table 2 displays the grading of the dune sand fine aggregate.

TABLE 1

Chemical composition of cement

| Constituent | Weight % |
|---|---|
| $SiO_2$ | 20.52 |
| $Fe_2O_3$ | 3.8 |
| $Al_2O_3$ | 5.64 |
| CaO | 64.35 |
| MgO | 2.11 |
| $Na_2O$ | 0.19 |
| $K_2O$ | 0.36 |
| $SO_3$ | 2.1 |
| Loss on ignition | 0.7 |
| Alkalis ($Na_2O$ + 0.658 $K_2O$) | 0.43 |
| $C_3S$ | 56.7 |
| $C_2S$ | 16.05 |
| $C_3A$ | 8.52 |
| $C_4AF$ | 11.56 |

TABLE 2

Grading of the dune sand fine aggregate

| ASTM Sieve # | Size (mm) | % Passing |
|---|---|---|
| 4 | 4.75 | 100 |
| 8 | 2.36 | 100 |
| 16 | 1.18 | 100 |
| 30 | 0.600 | 76 |
| 50 | 0.300 | 10 |
| 100 | 0.150 | 4 |

Crushed limestone with a maximum particle size of 12.5 mm was used as coarse aggregate in all the mixtures. The specific gravity of the crushed limestone coarse aggregate was 2.60, the water absorption was 1.1-1.4%, the fineness modulus was 3.23 and the unit weight was 1845 kg/m$^3$. In addition, the crushed limestone coarse aggregate had a 0.32% of material finer than ASTM standard #200 sieve, a loss on abrasion of 23.50% and a 0.45% of clay lumps friable fragments. The mineralogical composition of the crushed limestone coarse aggregate was 80% $CaCO_3$ and 20% $SiO_2$. Table 3 displays the chemical composition of the crushed limestone coarse aggregate used.

TABLE 3

Chemical composition of crushed limestone coarse aggregate

| Constituent | Weight % |
|---|---|
| CaO | 54.97 |
| $SiO_2$ | 0.01 |
| $Al_2O_3$ | 0.17 |
| $Fe_2O_3$ | 0.05 |
| $SiO_2 + Al_2O_3 + Fe_2O_3$ (≥70) | 0.23 |
| MgO | 0.64 |
| Loss on ignition | 43.66 |

The additional coarse aggregates were selected from the natural coarse aggregates expanded perlite and scoria and the synthetic coarse aggregate polypropylene beads. The expanded perlite aggregate was a graded material confirming to ASTM C332 Group I. Table 4 displays the chemical composition of the perlite used. Table 5 displays the grading of the perlite coarse aggregate. The specific gravity of this perlite material was 0.355 and the water absorption was 75%. In addition, the expanded perlite material had a dry loose weight minimum of 60 kg/m$^3$ and a dry loose weight maximum of 150 kg/m$^3$. The natural lightweight aggregate known as Scoria with a specific gravity of 1.5 and a water absorption of 22.2% was acquired from a local quarry and used. In addition, the scoria coarse aggregate has a fineness modulus of 5.4 and a unit weight of 866 kg/m$^3$. Polypropylene beads were obtained from a petrochemical plant. The specific gravity of the polypropylene beads is 0.886 and the water absorption is 0.008%.

TABLE 4

Chemical composition of expanded perlite coarse aggregate

| Constituent | Weight % |
|---|---|
| Silicon | 33.8 |
| Aluminum | 7.2 |
| Potassium | 3.5 |
| Sodium | 3.4 |
| Iron | 0.6 |
| Calcium | 0.6 |
| Magnesium | 0.2 |
| Trace | 0.2 |
| Oxygen (by difference) | 47.5 |
| Net Total | 97 |
| Bound Water | 3.0 |
| Total | 100 |

TABLE 5

Grading of the expanded perlite coarse aggregate

| ASTM Sieve # | Size (mm) | % Passing |
|---|---|---|
| 4 | 4.75 | 100 |
| 8 | 2.36 | 85-100 |
| 16 | 1.18 | 40-85 |
| 30 | 0.600 | 20-60 |
| 50 | 0.300 | 5-25 |
| 100 | 0.150 | 0-10 |

Heavy oil ash is generated during the burning of heavy oil in a power plant. The specific gravity of the heavy oil ash is 0.6 and the water absorption is 1.5%. Table 6 displays the chemical composition of the heavy oil ash used. Silica fume was acquired from a readymix concrete plant. The silica fume has a specific gravity of 2.2 and a water absorption of 1.0%. Table 7 displays the chemical composition of the silica fume used.

TABLE 6

Chemical composition of heavy oil ash industrial waste byproduct

| Constituent | Weight % |
|---|---|
| $SiO_2$ | 1.65 |
| CaO | 0.45 |
| $Al_2O_3$ | <10 |
| $Fe_2O_3$ | 0.47 |
| MgO | 0.48 |
| $K_2O$ | 0.03 |
| $Na_2O$ | 0.53 |
| $V_2O_5$ | 2.65 |
| Sulfur | 9.6 |
| $Na_2O + (0.658 K_2O)$, % | 0.55 |
| Loss on ignition | 60.6 |
| Moisture % | 5.9 |

TABLE 7

Chemical composition of silica fume industrial waste byproduct

| Constituent | Weight % |
|---|---|
| $SiO_2$ | 92.5 |
| $Al_2O_3$ | 0.72 |
| $Fe_2O_3$ | 0.96 |
| CaO | 0.48 |

TABLE 7-continued

Chemical composition of silica fume industrial waste byproduct

| Constituent | Weight % |
|---|---|
| MgO | 1.78 |
| SO₃ | — |
| K₂O | 0.84 |
| Na₂O | 0.5 |
| Loss on ignition | 1.55 |

Example 2

Preparation of Structural Lightweight Concrete Mixtures

A cementitious materials content of 400 kg/m$^3$ and a water/cementitious material (w/cm) ratio of 0.4 were maintained invariant in all of the structural lightweight concrete mixtures. Expanded perlite was the major lightweight aggregate component in all mixtures due to its superior thermal insulating properties. This was used to decrease the weight of the concrete in addition to improving the mechanical and thermal properties as well as the durability characteristics. Table 8 presents the details of the quantities of the mixtures used to prepare structural lightweight concretes with superior thermal insulation.

TABLE 8

Details of quantities of the mixtures

Percentage by Weight of Concrete

| Mix # | Cement, % | Total water, % | Coarse Aggregates | | | | Fine Aggregates Sand, % | Fines (Filler) | |
|---|---|---|---|---|---|---|---|---|---|
| | | | Limestone Aggregate, % | Perlite, % | Scoria, % | Polypropylene, % | | Silica Fume, % | Heavy Oil Ash, % |
| 1  | 28 | 16 | 20 | 6 | 0  | 9 | 17 | 0 | 6 |
| 2  | 23 | 17 | 15 | 6 | 15 | 0 | 18 | 6 | 0 |
| 3  | 25 | 15 | 21 | 6 | 0  | 9 | 18 | 6 | 0 |
| 4  | 23 | 14 | 22 | 6 | 0  | 3 | 25 | 6 | 0 |
| 5  | 23 | 14 | 25 | 6 | 0  | 3 | 25 | 3 | 0 |
| 6  | 23 | 17 | 18 | 6 | 15 | 0 | 18 | 3 | 0 |
| 7  | 24 | 16 | 27 | 7 | 0  | 0 | 24 | 0 | 2 |
| 8  | 24 | 17 | 18 | 6 | 12 | 0 | 22 | 0 | 1 |
| 9  | 24 | 19 | 0  | 4 | 30 | 0 | 21 | 0 | 1 |
| 10 | 24 | 16 | 16 | 4 | 15 | 0 | 21 | 0 | 3 |
| 11 | 24 | 16 | 12 | 6 | 18 | 0 | 22 | 2 | 0 |

The mixture constituents were mixed in a 0.7 m$^3$ concrete drum mixer for 2 to 3 minutes, and then about half of the water content was added while the drum was still rotating until all of the particles had become wet. The measured quantity of the superplasticizer was added gradually to the remaining water which was then added to the mixture. The mixing was continued until a uniform consistency was achieved. The mixed concrete was poured into the molds of required sizes and shapes, which were suitable for determining the properties of the developed structural lightweight concrete. The molds were vibrated until a thin mortar film appeared on the surface of the specimen. The specimens were covered, after casting, with a plastic sheet for 24 hours in a laboratory environment (22±3° C.) to minimize the loss of water in the mixture. After 24 hours, the specimens were demolded and placed in a tank filled with water for 28 days for further curing.

Example 3

Evaluation of the Properties of Structural Lightweight Concrete Mixtures

The aim of this study was to develop structural lightweight concrete with the use of natural lightweight aggregates, such as expanded perlite and scoria, artificial aggregates, such as polypropylene, and industrial waste byproducts, such as heavy oil ash and silica fume. The primary mixtures included i) mixtures with expanded perlite aggregate, polypropylene, and heavy oil ash or silica fume (Table 8, mixtures 1, 3, 4 and 5), ii) mixtures with expanded perlite, scoria, and heavy oil ash or silica fume (Table 8, mixtures 2, 6, 8, 9, 10, and 11), and iii) mixtures with expanded perlite (without scoria and polypropylene) and heavy oil ash (Table 8, mixture 7).

The 28-day average unit weight of the specimens was measured on 100 mm×100 mm×100 mm cube specimens by determining their weight and volume. The mixtures utilizing expanded perlite aggregate, polypropylene, and heavy oil ash or silica fume have a 28-day unit weight in the range of 1674 kg/m$^3$ to 1785 kg/m$^3$ and these values satisfy the unit weight requirements for structural lightweight concrete. The mixtures utilizing expanded perlite aggregate, scoria, and heavy oil ash or silica fume have a 28-day unit weight in the range of 1830 kg/m$^3$ to 1891 kg/m$^3$ and these values satisfy the unit weight requirements for structural lightweight concrete. The mixtures utilizing expanded perlite (without scoria and polypropylene) and heavy oil ash have a 28-day unit weight of 1771 kg/m$^3$ and this value is within the unit weight requirements for structural lightweight concrete.

Compressive strength was determined according to ASTM C 39 standard after 7, 14, and 28 days of curing in water. The rate of loading applied was 3.0 kN/s until the failure of the 100 mm×100 mm×100 mm cube specimen and the compressive strength was then determined by dividing the failure load by the area of the cross section. The mixtures utilizing expanded perlite aggregate, polypropylene, and heavy oil ash or silica fume have a compressive strength that varied from 21.3 MPa to 25.8 MPa and these values are more than the strength requirement for structural lightweight concrete. The mixtures utilizing expanded perlite aggregate, scoria, and heavy oil ash or silica fume have a compressive strength that varied from 21 MPa to 35.4 MPa and these values are more than the strength requirement for structural lightweight concrete. The mixtures utilizing expanded perlite (without scoria and polypropylene) and heavy oil ash have a compressive strength of 19.7 MPa and this value is slightly lower than the strength requirement for structural lightweight concrete of 20 MPa.

The thermal conductivity was determined according to ASTM C201 standard. Slab specimens measuring 350 mm×350 mm×50 mm in size were utilized to evaluate the thermal conductivity using a Dynatech guarded hot plate thermal conductance measuring system, TCFG-R4-6, under steady state conditions. The slab specimens were dried in an oven at 70° C. to expel any moisture. Thermocouples were connected at five different locations in the bottom and top of the specimen which was wrapped in a piece of soft and thick cloth to achieve stable test conditions. The mixtures utilizing expanded perlite aggregate, polypropylene, and heavy oil ash or silica fume have a thermal conductivity in the range of 0.413 W/(m·K) to 0.657 W/(m·K), which is low compared to the thermal conductivity of normal weight concrete that is in the range of 1.185 W/(m·K) to 1.448 W/(m·K) which makes these developed structural lightweight concretes highly desirable for energy conservation. The mixtures utilizing expanded perlite aggregate, scoria, and heavy oil ash or silica fume have a thermal conductivity in the range of 0.362 W/(m·K) to 0.483 W/(m·K), which is low compared to the thermal conductivity of normal weight concrete that is in the range of 1.185 W/(m·K) to 1.448 W/(m·K) which makes these developed structural lightweight concretes highly desirable for energy conservation. The mixtures utilizing expanded perlite (without scoria and polypropylene) and heavy oil ash have a thermal conductivity of 0.393 W/(m·K) which is low compared to the thermal conductivity of normal weight concrete that is in the range of 1.185 W/(m·K) to 1.448 W/(m·K) which makes this developed structural lightweight concrete material can be utilized for thermal insulation purposes.

The aim of this study was to develop structural lightweight concretes with superior thermal performance utilizing natural lightweight aggregates, such as expanded perlite and scoria and artificial aggregates, such as polypropylene as well as industrial waste byproducts, such as heavy oil ash and silica fume. Concrete mixtures prepared with expanded perlite, polypropylene, and heavy oil ash or silica fume exhibit very low unit weight, moderate compressive strength and low thermal conductivity. Concrete mixtures prepared with expanded perlite, scoria, and heavy oil ash or silica fume exhibit low unit weight, high compressive strength and low thermal conductivity. Concrete mixtures prepared with expanded perlite, and heavy oil ash exhibit low unit weight, medium compressive strength and low thermal conductivity. All of the developed structural lightweight concretes have exhibited low unit weight, acceptable compressive strength and low thermal conductivity. Consequently, they can be utilized as structural lightweight concretes with high thermal insulation. The high thermal insulation may lead to significant savings in the energy required for air conditioning in hot weather conditions and heating in cold weather conditions.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A lightweight concrete product casting method, comprising:
   mixing a cement, a fine aggregate, a natural coarse aggregate, spherical polymeric beads and a industrial waste byproduct in the form of fine particles to form a solid cement mixture having the following composition:
   the cement;
   the fine aggregate;
   the natural coarse aggregate which comprises 10-25 wt % expanded perlite based on the weight of the natural coarse aggregate;
   the synthetic coarse aggregate which comprises a spherical polymeric material beads;
   the industrial waste byproduct which is in the form of fine particles;
   wherein the average particle size of the fine aggregate and the industrial waste byproduct is less than or equal to 1 mm and the average particle size of the synthetic coarse aggregate spherical polymeric beads and the natural coarse aggregate is greater than 1 mm;
   wherein the weight ratio of water to cement is in the range of 0.33 to 0.8 and is sufficient to affect hydraulic setting of the cement; and
   wherein the spherical polymeric beads have a specific gravity of 0.8-0.95;
   adding water and a superplasticizer to the cement mixture to affect hydraulic setting while maintaining a slump in the range of 50-100 mm to form a fluid concrete mixture;
   casting the fluid concrete mixture in a predetermined shape by placing the fluid concrete mixture in a mold to produce a cast concrete product after setting.

2. The method of claim 1, wherein the spherical polymeric beads are spherical polypropylene beads pith an average particle size of 4-15 mm.

3. The method of claim 1, wherein the fine aggregate is sand with an average particle size of less than 700 μm.

4. The method claim 1, wherein the natural coarse aggregate comprises crushed limestone having an average particle size in the range of 1-20 mm.

5. The method of claim 1, wherein the industrial waste byproduct is at least one selected from the group consisting of silica fume and heavy oil ash.

6. The method of claim 1, wherein the superplasticizer is a polycarboxylate ether.

* * * * *